(12) United States Patent
Coste

(10) Patent No.: US 7,301,460 B2
(45) Date of Patent: Nov. 27, 2007

(54) PACKAGING THAT CAN BE CHECKED FOR TAMPERING

(75) Inventor: François Coste, Chennevieres sur Marne (FR)

(73) Assignee: Neopost Industrie, Bagneux (FR)

( * ) Notice: Subject to any disclaimer, the term of this patent is extended or adjusted under 35 U.S.C. 154(b) by 184 days.

(21) Appl. No.: 11/046,059

(22) Filed: Jan. 28, 2005

(65) Prior Publication Data

US 2005/0184871 A1    Aug. 25, 2005

(30) Foreign Application Priority Data

Jan. 30, 2004    (FR) ................................. 04 00900

(51) Int. Cl.
   *G08B 13/14* (2006.01)
(52) U.S. Cl. .............. 340/572.7; 340/539; 340/539.31; 340/572.1
(58) Field of Classification Search ...................... None
   See application file for complete search history.

(56) References Cited

U.S. PATENT DOCUMENTS

| | | | | |
|---|---|---|---|---|
| 4,811,288 A | * | 3/1989 | Kleijne et al. ................ | 365/52 |
| 5,233,505 A | * | 8/1993 | Chang et al. ................ | 361/785 |
| 5,285,734 A | * | 2/1994 | MacPherson ................ | 109/42 |
| 5,497,140 A | | 3/1996 | Tuttle ........................... | 342/51 |
| 5,539,379 A | * | 7/1996 | MacPherson ................ | 340/550 |
| 6,050,622 A | * | 4/2000 | Gustafson ................ | 292/307 R |
| 6,100,804 A | * | 8/2000 | Brady et al. ............. | 340/572.7 |
| 6,107,920 A | * | 8/2000 | Eberhardt et al. ....... | 340/572.7 |
| 6,259,369 B1 | * | 7/2001 | Monico ................... | 340/572.8 |
| 6,703,935 B1 | * | 3/2004 | Chung et al. ............ | 340/572.7 |
| 2003/0173397 A1 | * | 9/2003 | Kourakov ................... | 229/311 |

FOREIGN PATENT DOCUMENTS

| EP | 1 162 480 A2 | 6/2001 |
|---|---|---|
| EP | 1 291 818 A1 | 3/2003 |

\* cited by examiner

*Primary Examiner*—Benjamin C. Lee
*Assistant Examiner*—Son Tang
(74) *Attorney, Agent, or Firm*—Perman & Green, LLP

(57) ABSTRACT

The invention relates to packaging, e.g. an envelope or a parcel, that can be checked for tampering, which packaging includes a hermetically sealed body, the body being formed by folding a sheet of material that has been cut to a predefined shape. In order to track the object packaged in the packaging and in order to check the packaging for tampering, the tampering further includes an electronic component that can be interrogated remotely and that is formed by data storage means connected to an antenna. The antenna is formed by an antenna circuit which extends at least over the entire periphery of the inside surface of the sheet of material. Thus, any fraudulent opening of the packaging can be detected by the antenna circuit breaking, thereby making any transmission with the component of the packaging impossible.

10 Claims, 3 Drawing Sheets

PACKAGING THAT CAN BE CHECKED FOR TAMPERING

CROSS-REFERENCE TO RELATED APPLICATIONS

This applications claims priority from French Patent Application No. 04 00900 filed Jan. 30, 2004.

FIELD OF THE INVENTION

The present invention relates to packaging elements, such as envelopes, boxes, or parcels that can be checked electronically for tampering.

PRIOR ART

Radio-Frequency Identification (RFID) technology is in very widespread use in many fields. That technology is often used in labels referred to as "radio tags" and that include an electronic chip that contains digital information that is consultable remotely at radio frequency by means of a read device.

Although their main function consists in storing information that is easy to access remotely, such tags are sometimes used as tampering indicators for checking whether a packaging element such as an envelope or a parcel has been opened in unauthorized manner. In which case, the tag is provided with a tie that, once broken, prevents any possibility of reading the information contained in the chip of the tag. The tag equipped with a tie thus acts as a seal and is placed at the portions of the item that are manipulated for opening it. For example, for an envelope, the tie of the tag is fastened between the opening flap and the remainder of the body of the envelope so that said envelope cannot be opened normally without breaking the tie.

However, that type of tag makes it possible to check whether unauthorized opening has taken place only when the packaging element has been opened conventionally, i.e. by manipulating the means provided for opening it. For example, it is quite possible to access the contents of an envelope or of a parcel without touching the opening means provided for the purpose of opening it, by cutting open one edge of the envelope or one surface of the parcel. In which case, the tie is not broken, and the remote electronic checking of the parcel for tampering is ineffective. Only meticulous visual inspection makes it possible to determine whether the packaging has been tampered with. In an industrial context such as the context of a shipping or logistics company, for example, such a solution appears to be unrealistic in view of the quantities of envelopes or of parcels to be handled every day.

OBJECT AND BRIEF DESCRIPTION OF THE INVENTION

An object of the present invention is to remedy the above-mentioned drawbacks and to provide packaging that can be checked electronically for tampering regardless of which portion of the packaging has been opened.

These objects are achieved by means of packaging that can be checked for tampering, which packaging comprises a hermetically sealed body, said body being formed by folding a sheet of material that has been cut to a predefined shape, which package, in accordance with the invention, further comprises an electronic component that can be interrogated remotely and that is formed by data storage means connected to an antenna circuit, said antenna circuit extending at least over the entire periphery of the inside surface of the sheet of material.

Thus the packaging of the invention includes storage means that can be interrogated remotely and that are useful for identifying and tracking an object transported in the packaging while also acting as a tampering indicator for indicating whether the packaging has been tampered with. Since the antenna circuit is disposed over the entire periphery of the sheet of material, any opening of the packaging from any edge thereof is detected because such opening gives rise to a break in the antenna circuit. The packaging is checked for tampering by interrogating it remotely: if it is not possible to read the information stored in the component, that indicates that the antenna has been broken as a result of fraudulent opening.

The antenna circuit may also extend over the main inside faces of the sheet of material. The level of opening detection is thus increased because even opening of the packaging by means of an incision being made in one of the faces thereof can be detected.

In order to cover additional detection zones on the packaging, the antenna circuit disposed on the sheet of material may describe a series of undulations or of zigzags.

According to a characteristic of the invention, the data storage means and the antenna circuit of the electronic component are disposed on the inside surface of the sheet of material so that it is protected inside the packaging once said packaging has been assembled.

According to another characteristic of the invention, a first portion of the antenna circuit is disposed on one inside face of the sheet of material, the complementary second portion of the antenna circuit being disposed on the other inside face of the sheet at a place determined so that it completes the first portion of the circuit once the packaging has been assembled.

The antenna circuit may be constituted by a very thin conductor wire that is bonded by adhesive to the inside surface of the sheet of material, or by a conductive ink deposited on the inside surface of the sheet of material. The use of a conductive ink makes it easy to form a variety of patterns in the antenna circuit, such as undulations or zigzags, for example.

The invention is applicable to various types of packaging such as, in particular, envelopes or foldable boxes used as parcels. When the packaging is provided with weak portions, a portion of the antenna circuit may cross said weak portions so as to make it easier for said circuit to be broken in the event of fraudulent opening.

BRIEF DESCRIPTION OF THE DRAWINGS

Other characteristics and advantages of the invention appear from the following description of particular embodiments of the invention, given as non-limiting examples, with reference to the accompanying drawings, in which.

DETAILED DESCRIPTION OF EMBODIMENTS OF THE INVENTION

In order to avoid unnecessarily complicating the description, the present invention is described essentially with reference to envelopes and parcel boxes that are packaging elements in common use for carrying documents or objects. However, it appears clearly that the present invention is applicable to any other type of packaging which, once assembled, forms a hermetically sealed enclosure around the packaged object.

Figure 1:
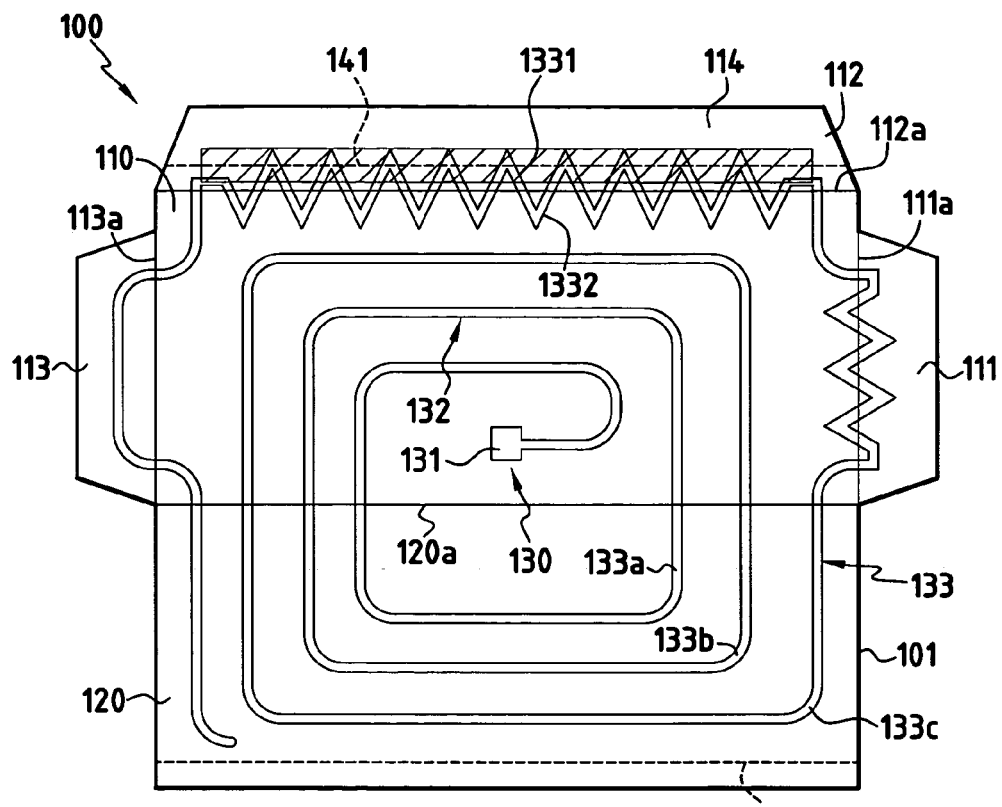
FIG. 1 is a view of an envelope in an unfolded state showing a first embodiment of packaging of the present invention.
Figure 2:
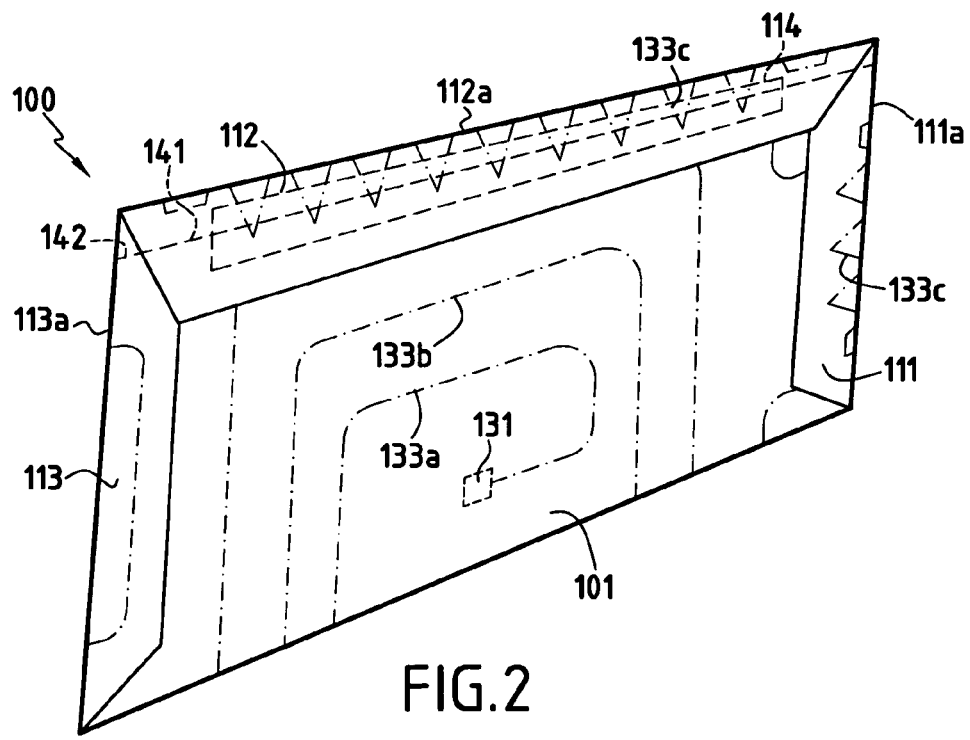
FIG. 2 is a view of the envelope of FIG. 2 as assembled.

FIGS. 1 and 2 show an embodiment of packaging of the present invention applied to a conventional letter envelope. FIG. 1 shows an envelope 100 in its unfolded form. The envelope 100 is formed from a sheet 101 of paper or the like which is cut out to a plan that defines the various elements to fold and to assemble together in order to form the body of the envelope in which the object (e.g. documents) to be carried can be received.

In the example considered, the sheet 101 has a first portion 110 provided with three flaps 111, 112, and 113, and a second portion 120. In well known manner, the envelope is assembled by folding the portions 110 and 120 over along the fold line 120a, the flaps 111 and 113 closing the side edges of the envelope by being folded over along the lines 111a and 113a, and by being bonded with adhesive to the portion 120. The sheet 101 thus folded and bonded with adhesive forms the envelope 100 into which objects, such as documents, can be inserted via the opening left open by the portion 112. Once filled, the envelope is closed finally in well known manner by means of the portion 112 whose face facing the portion 120 is provided with a self-adhesive strip 114.

The present invention seeks to form packaging that can be checked remotely, reliably, and rapidly for tampering. For this purpose, an electronics component 130 of the transponder type is used as an indicator for such tampering. Since the electronics component can be interrogated remotely as described in detail below, if said component is damaged physically to the point of no longer being interrogatable, it is possible to determine that the packaging has been opened in unauthorized manner. In other words, if the component is mechanically and therefore electronically intact, this indicates that the package of the invention has not been tampered with.

More precisely, as shown in FIG. 1, the electronics component 130 is formed by an electronics chip 131 connected to an antenna 132, both of which are disposed on an inside surface of the sheet 101. The antenna 132 makes it possible for the information contained in the chip to be read remotely. The antenna 132 is formed by a circuit or winding 133 which comprises two conductors 1331 and 1332 that meet at the end of the antenna circuit 133. The conductors 1331 and 1332 are also connected to the chip 131. The conductors 1331 and 1332 therefore form a closed circuit (loop) corresponding to the antenna circuit 133. Thus, any break in either of the conductors 1331, 1332 anywhere around the antenna circuit 133 opens said circuit and makes any transmission with the electronics chip impossible. In the invention, checking the packaging for tampering (i.e. detecting opening thereof) takes place as a function of the state of the antenna circuit which is either closed and operational, indicating that the packaging is intact, or else interrupted at one or more places, then indicating that the package has been opened. In addition, the presence of the electronics chip 131 and of the antenna circuit 132 on the inside surface only of the envelope guarantees excellent confidentiality for the tempering checking.

The chip 131 comprises mainly a data memory electronic circuit that can be read accessed and also optionally write accessed. Reading data from and optionally writing data to the memory takes place by radio-frequency transmission, in particular by means of the antenna 132. If the circuit that is constituted by the antenna 132 is interrupted, said antenna becomes non-operational and no transmission with the chip 131 can then be performed, thereby indicating that the envelope has been opened fraudulently.

In order to detect unauthorized opening of the envelope regardless of which edge of the envelope is cut or torn open, the antenna circuit 133 is disposed at least over the entire periphery of the envelope (turn 133c in FIG. 1) so as to cover all of the edges of the envelope. In this way, the antenna 132 passes at least once over the fold lines 111a, 112a, 113a, and 120a that form the edges of the envelope 100 after assembly. Thus, once the envelope is assembled and closed as shown in FIG. 2, the antenna 132 is present over all of the edges of the envelope and any attempt to open it via any one of said edges can be detected, unlike in the prior art device which only makes it possible to detect opening via the flap 112.

The antenna circuit 133 can also extend over the inner regions of the portions 110 and 120 (turns 133a and 133b) in order to make it possible to detect opening of the envelope via the main front or back faces.

In addition in order to increase the security level even further, the antenna 132 can have zigzagging or undulating portions as shown on the flaps 111 and 112 in FIG. 1. A higher number of detection zones are thus formed over the envelope so that even a small incision of the envelope can be detected. More generally, undulation or zigzag angle is chosen so as to prevent any extraction of a document or of an object from the packaging. Therefore, the spacing between undulations or zigzags is determined as a function of the size of the object enclosed in the packaging.

Also for the purpose of increasing the level of detection of opening of the envelope, said envelope can be provided with weak portions that correspond to discontinuous cuts or to micro-perforations at the zones in which the flaps are bonded, so as to cause a fraction of the flap and/or of the corresponding portion of the envelope to tear. In the example shown in FIG. 1, weak zones 141 and 142 are respectively present on the flap 112 in the zone through which the antenna circuit 133 passes, and on the portion 120 in the zone in which the flap 112 is bonded. Thus, any attempt to open the flap 112 causes one or more fractions of it and/or of the portion 120 to be torn off. The fractions torn off from the flap 112 generate irreversible breaks in the antenna circuit. Weak portions can naturally be present on the other flaps and corresponding portions of the envelope.

Figure 5:
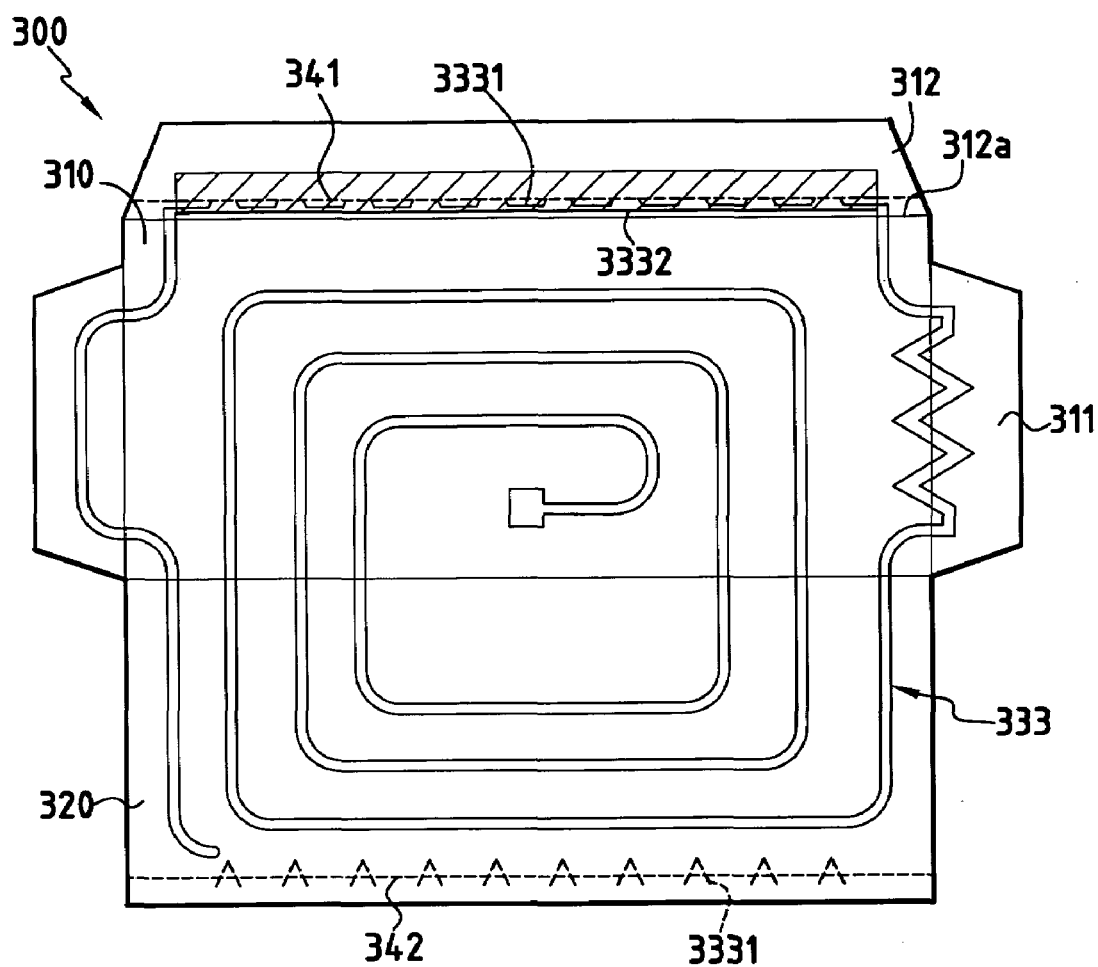
FIG. 5 is a variant embodiment of the envelope of FIG. 1.

FIG. 5 shows a variant embodiment of an envelope of the invention that can be checked for tampering. The envelope shown in FIG. 5 differs from the envelope of FIG. 1 in that complementary portions of the antenna circuit 333 are disposed both on the flaps and on the main portions of the envelope. In the example shown in FIG. 5, a portion of the antenna circuit 333 is disposed on the flap 312 while a complementary other portion, corresponding to the portions of the conductor 3331 that are missing from the flap 312 is disposed on the portion 320 on the other side of the sheet of material. Thus, it is only once the envelope is closed by the flap 312 being folded over and bonded by adhesive onto the portion 320 (which has been folded over onto the portion 310 as shown in FIG. 2) that the conductors 3331 and 3332 form a continuous path over the inside surface of the sheet of material, thereby closing the antenna circuit 333. When the envelope is closed, its configuration is as shown in FIG. 2. This makes it possible to detect any opening of the envelope by unsticking the flap 312. Even if the flap 312 is unstuck carefully, it must then be stuck back accurately, i.e. reliably and by being correctly fitted back into place, otherwise the antenna circuit remains open and thus non-operational.

In addition, as in the embodiment shown in FIG. 1, weak portions (defined by pre-cuts) 341 and/or 342 can be present in particular in the zones through which the circuit 333 passes, thereby making it impossible to open the envelope without tearing the weak portions, giving rise to irreversible break points in the antenna circuit.

The use of weak portions is described herein with reference to envelopes, but they can also be implemented in any other type of packaging.

Therefore, in accordance with the invention, it is possible to implement envelopes that can be checked remotely for tampering with a very high level of reliability. In addition, since the electronic component 130 and more particularly the antenna 132 are disposed only inside the envelope, it is very difficult to determine the points through which the antenna passes when looking from the outside of the envelope. In addition, the component 130 is protected inside the envelope, thereby making it possible to prevent said component from being damaged by handling of the envelope during sorting or transport.

Figure 3:
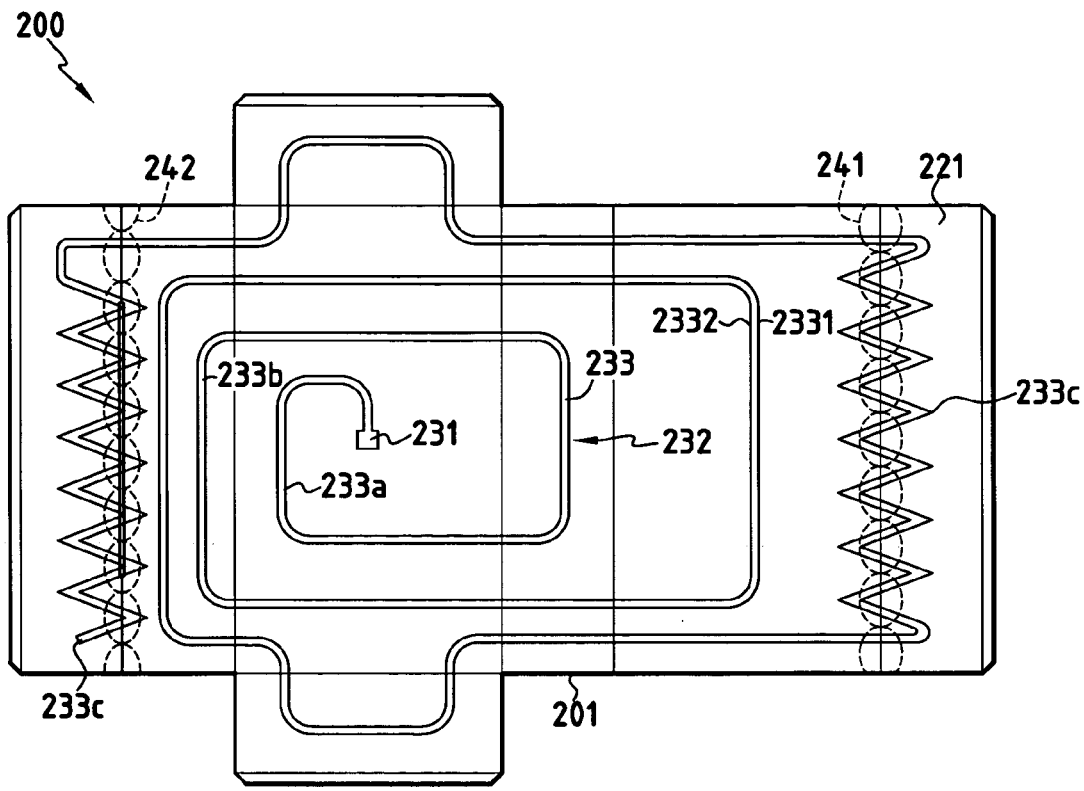
FIG. 3 is a view of a box in an unfolded form, corresponding to a second embodiment of the packaging of the invention.
Figure 4:
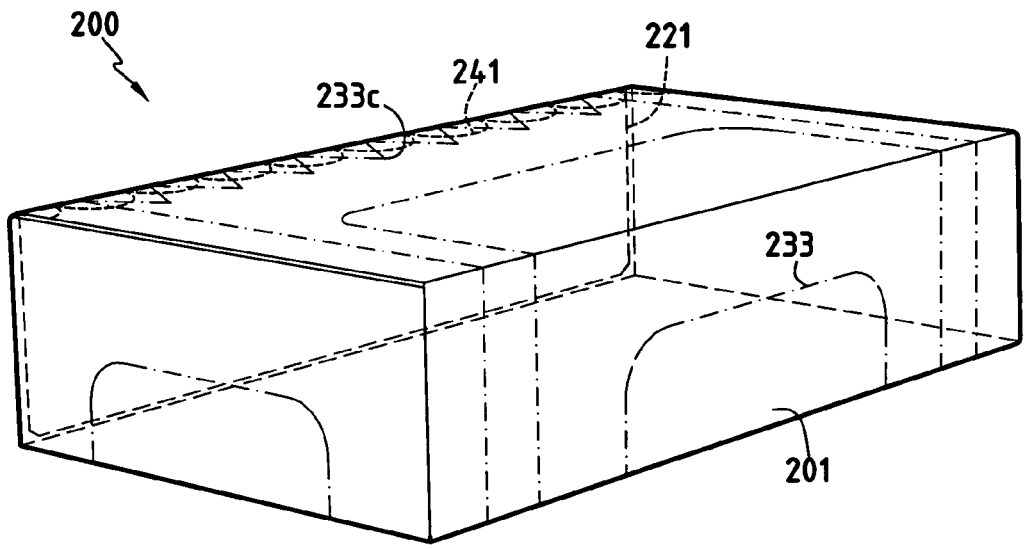
FIG. 4 is a view of the box of FIG. 3 as assembled.

FIGS. 3 and 4 show a second embodiment of packaging of the invention. In this embodiment, the invention is applied to a foldable box 200 as in common use for postal parcels. The principle implemented is the same as described above with reference to the envelope 100 shown in FIGS. 1 and 2.

As shown in FIG. 3, an electronic component 230, formed by an electronic chip 231 connected to an antenna 232, is disposed on the inside surface of a sheet 201 of cardboard or the like. The antenna 232 extends at least in the vicinity of the entire periphery of the envelope (turn 233c in FIG. 1) so as to cover all of the edges of the box 200. In this way, the circuit 233 of the antenna 232 passes at least once over the fold lines that form the edges of the box 200 after it has been assembled (FIG. 4).

As in the above-described envelope, the antenna circuit 233 can also extend over the main faces inside the box 200 (turns 233a and 233b) so as also to cover the faces thereof (i.e. the lid, bottom, and side faces). Therefore, any opening made on any one of the surfaces of the box can also be detected. The antenna can be disposed in the form of a conventional winding, or in undulating or zigzagging form in order to increase even further the number of detection zones in the box.

Like the above-described envelopes, the packaging of the foldable box type can include weak portions serving as opening indicators. Such portions, which are made weak by means of pre-cuts, are irremediably torn off when the packaging is opened, thereby enabling opening of the box to be seen even if the opened portions are stuck back on. Such indicators are shown on the box 200 in FIGS. 3 and 4. They are formed by a series of pre-cut circles 241 and 242 disposed on respective ones of the flaps 212 and 221 via which the box is opened. In a box, or in any other type of packaging provided with such indicators, it can be advantageous to dispose a portion of the antenna circuit over said indicators so as to increase detection of any attempt to open the box.

The above-described antenna circuits 133 or 233 can be formed using a very thin flat conductor wire that is bonded with adhesive to the inside surface of the sheet of material prior to assembly, or else by means of conductive ink deposited by printing on the inside surface of the sheet of material. Forming the antenna by depositing (printing) a conductive ink makes it easy to achieve varied shapes, in particular undulations or zigzags, in the antenna circuit.

The antenna circuit shapes that are described above are merely examples of possible configurations for an antenna circuit. The person skilled in the art can, without any difficulty, imagine any other antenna circuit shape adapted to the shape or to the dimensions of the packaging or to particular packaging security needs.

The invention proposes packaging that is provided with electronic means that make it possible not only to identify and track the packaging remotely, but also to check the packaging rapidly and reliably for tampering. Such checking does not require implementation of means other than those in common use because it is performed when reading the information stored in the electronic chip. If the reader cannot read the stored information, that indicates that the antenna circuit has been broken during fraudulent opening of the packaging.

The means used to read the information remotely are well known. For example, the stored data, such as an identification code, can be read by means of a portable reader (not shown) which mainly comprises a display screen, a control keypad, and means (a transponder) for activating the chip by radio-frequency (RF). The activation means send a radio-frequency wave to the chip via the antenna fixed inside the packaging. The received wave charges a capacitor present in the circuit of the chip which, while the capacitor is discharging, sends back to the reader a code or an item of information written in the memory of the chip.

The code and/or the items of information of each chip interrogated are thus send to the reader and displayed on its screen and/or stored in a memory, or transferred, via a serial link, to a processing computer for sorting or tracking the packaging.

Alternatively, when identification and tracking are to be performed on a large scale and automatically, it is possible to use various types of non-portable readers, such as a reader of the gantry type under which the items of packaging pass, which items of packaging have antenna shapes that enable reading to take place on a large scale and from a greater distance.

What is claimed is:

1. Packaging for preventing tampering comprising a hermetically sealed body, said body being formed by folding a sheet of material that has been cut to a predefined shape, the body including fold lines or edges;

said packaging further comprising an RFID electronic component that can be interrogated remotely and that is formed by data storage means connected to an antenna circuit, said antenna circuit extending at least over the entire periphery of the inside surface of the sheet of material including all of said fold lines or edges, such that tampering of the packaging is detected as a result of changes in said antenna circuit.

2. Packaging according to claim 1, wherein the antenna circuit also extends over the main inside faces of the sheet of material.

3. Packaging according to claim 1, wherein the antenna circuit disposed on the sheet of material describes a series of undulations or of zigzags.

4. Packaging according to claim 1, wherein the data storage means and the antenna circuit of the electronic component are disposed on the inside surface of the sheet of material so that it is protected inside the packaging once said packaging has been assembled.

5. Packaging according to claim 1, wherein a first portion of the antenna circuit is disposed on one inside face of the sheet of material, the complementary second portion of the antenna circuit being disposed on the other inside face of the sheet at a place determined so that it completes the first portion of the circuit once the packaging has been assembled.

6. Packaging according to claim 1, wherein the antenna circuit is constituted by a very thin conductor wire bonded by adhesive to the inside surface of the sheet of material.

7. Packaging according to claim 1, wherein the antenna circuit is constituted by a conductive ink deposited on the inside surface of the sheet of material.

8. Packaging according to claim 1, wherein the body of said packaging forms an envelope.

9. Packaging according to claim 1, wherein the body of said packaging forms a box.

10. Packaging according to claim 1, wherein the packaging is provided with weak portions, and wherein at least a portion of the antenna circuit crosses said weak portions that are defined by precuts.

* * * * *